(12) United States Patent
Huang

(10) Patent No.: US 11,196,318 B2
(45) Date of Patent: Dec. 7, 2021

(54) CANNED MOTOR DEVICE

(71) Applicant: ZI YI ELECTRICAL ENGINEERING CO., LTD., Taichung (TW)

(72) Inventor: Ting-Tsai Huang, Taichung (TW)

(73) Assignee: Zi Yi Electrical Engineering Co., LTD, Taichung (TW)

( * ) Notice: Subject to any disclaimer, the term of this patent is extended or adjusted under 35 U.S.C. 154(b) by 146 days.

(21) Appl. No.: 16/802,774

(22) Filed: Feb. 27, 2020

(65) Prior Publication Data

US 2021/0273517 A1 Sep. 2, 2021

(51) Int. Cl.
| | |
|---|---|
| *H02K 5/128* | (2006.01) |
| *F04D 13/06* | (2006.01) |
| *H02K 5/10* | (2006.01) |
| *H02K 5/12* | (2006.01) |

(52) U.S. Cl.
CPC ............... *H02K 5/10* (2013.01); *H02K 5/128* (2013.01); *F04D 13/0606* (2013.01); *H02K 5/12* (2013.01)

(58) Field of Classification Search
CPC ............ H02K 5/10; H02K 5/12; H02K 5/128; H02K 5/1282; H02K 5/1285; H02K 5/132; H02K 9/197; F04D 13/0606; F04D 13/06; F04D 13/0626; F04D 13/062; F04D 29/083; F04D 29/086

USPC ..................................................... 310/86, 88
See application file for complete search history.

(56) References Cited

U.S. PATENT DOCUMENTS

| | | | | |
|---|---|---|---|---|
| 2004/0184936 A1* | 9/2004 | Yanagihara | ........... | F04D 13/025 417/420 |
| 2013/0115118 A1* | 5/2013 | Chien | ................. | F04D 13/0626 417/420 |

FOREIGN PATENT DOCUMENTS

TW           I424661 B           1/2014

* cited by examiner

*Primary Examiner* — Quyen P Leung
*Assistant Examiner* — Alexander Moraza
(74) *Attorney, Agent, or Firm* — Quinn IP Law

(57) ABSTRACT

A canned motor device includes a fixed seat, a motor unit, and a rear cover protector and a leakproof member. The rear cover protector has a main body portion disposed between a case body and a stator of the motor unit and sleeved around a cylindrical portion of the case body, and an extended portion connected to the main body portion, perpendicular to an axis, fluid-tightly abutting against a flange portion of the case body, and having an outer periphery that surrounds the axis and that has an outline larger than that of an annular periphery of the flange portion of the case body. The leakproof member is mounted between the flange portion of the case body and the extended portion of the rear cover protector.

5 Claims, 2 Drawing Sheets

CANNED MOTOR DEVICE

FIELD

The disclosure relates to a motor device, and more particularly to a canned motor device for a chemical filter.

BACKGROUND

A conventional canned motor device disclosed in Taiwanese Patent No. 1424661 includes a front cover, a support frame, an impeller, a cup-shaped rear cover, an inner rotor, an outer rotor, a stationary shaft and a handling frame. The rear cover is a double-layered structure, and has an inner lining made of a fluoroplastic material and a reinforced layer.

While the inner lining and the reinforced layer abut against one another to form the double-layered structure of the rear cover, outline of periphery of the reinforced layer is smaller than that of periphery of the inner lining. As such, when the motor device is used in a chemical processing instrument, if the inner lining is damaged, chemical fluid may easily leak through the crack of the inner lining into the gap between the inner lining and the reinforced layer, and then into the outer rotor through a periphery of the reinforced layer, corroding the motor device.

SUMMARY

Therefore, an object of the disclosure is to provide a canned motor device that can alleviate the drawback of the prior art.

According to the disclosure, the canned motor device includes a fixed seat, a motor unit positioned relative to the fixed seat, a rear cover protector, and a leakproof member.

The motor unit includes a case body that has a hollow cylindrical portion and a flange portion, a stator that is sleeved around the case body, and a rotor. The cylindrical portion extends along and surrounds an axis to define a mounting space therein, and is formed with an open end and a closed end. The flange portion is connected to the open end of the cylindrical portion, is perpendicular to the axis, and has an annular periphery that surrounds the axis. The rotor is mounted in the mounting space of the cylindrical portion of the case body.

The rear cover protector has a main body portion that is disposed between the case body and the stator and that is sleeved around the cylindrical portion of the case body, and an extended portion that is connected to the main body portion, that is perpendicular to the axis, that fluid-tightly abuts against the flange portion of the case body, and that has an outer periphery surrounding the axis and having an outline larger than that of the annular periphery of the flange portion of the case body.

The leakproof member is mounted between the flange portion of the case body and the extended portion of the rear cover protector.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
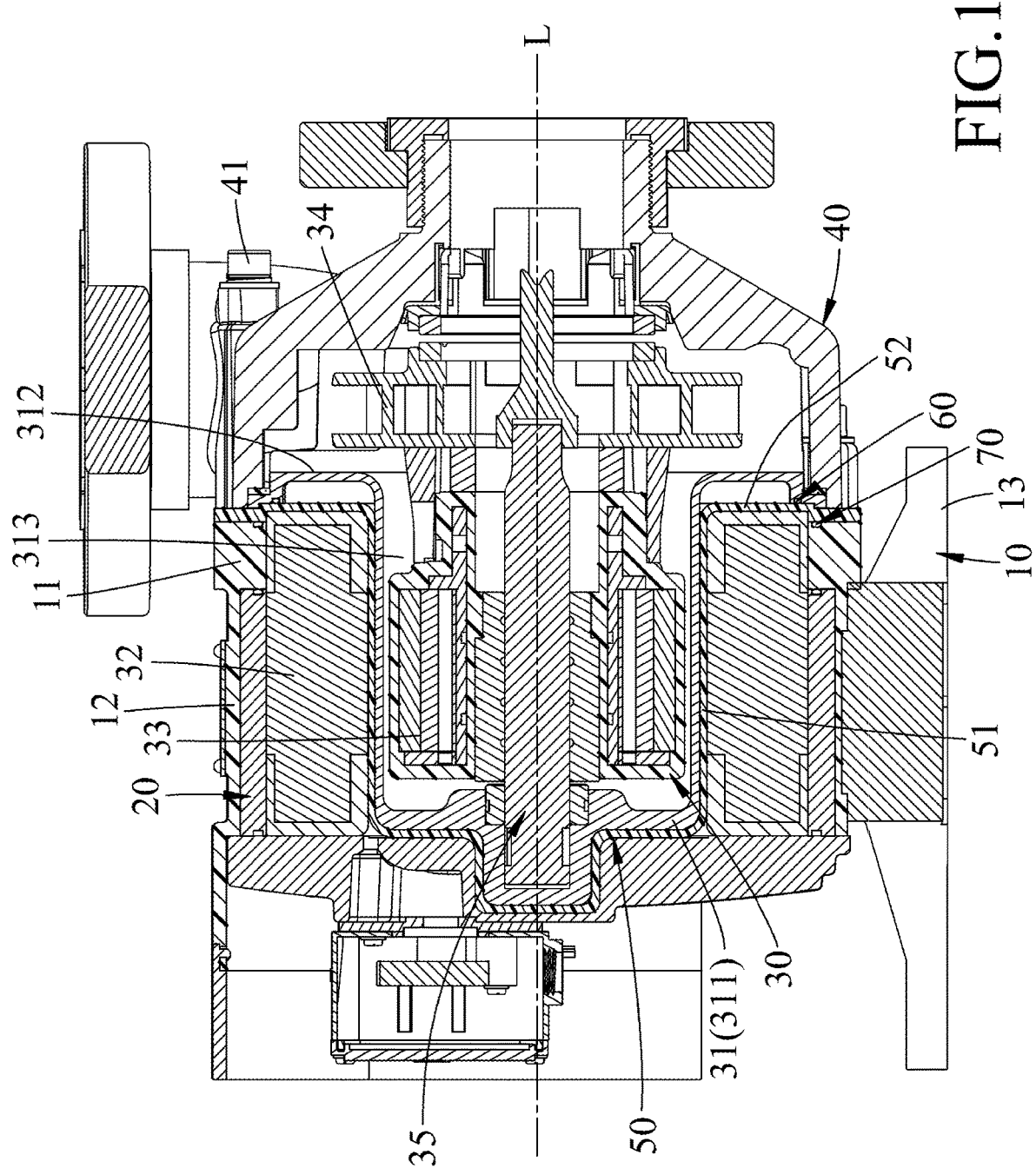
FIG. 1 is a sectional view of an embodiment of a canned motor device according to the disclosure.
Figure 2:
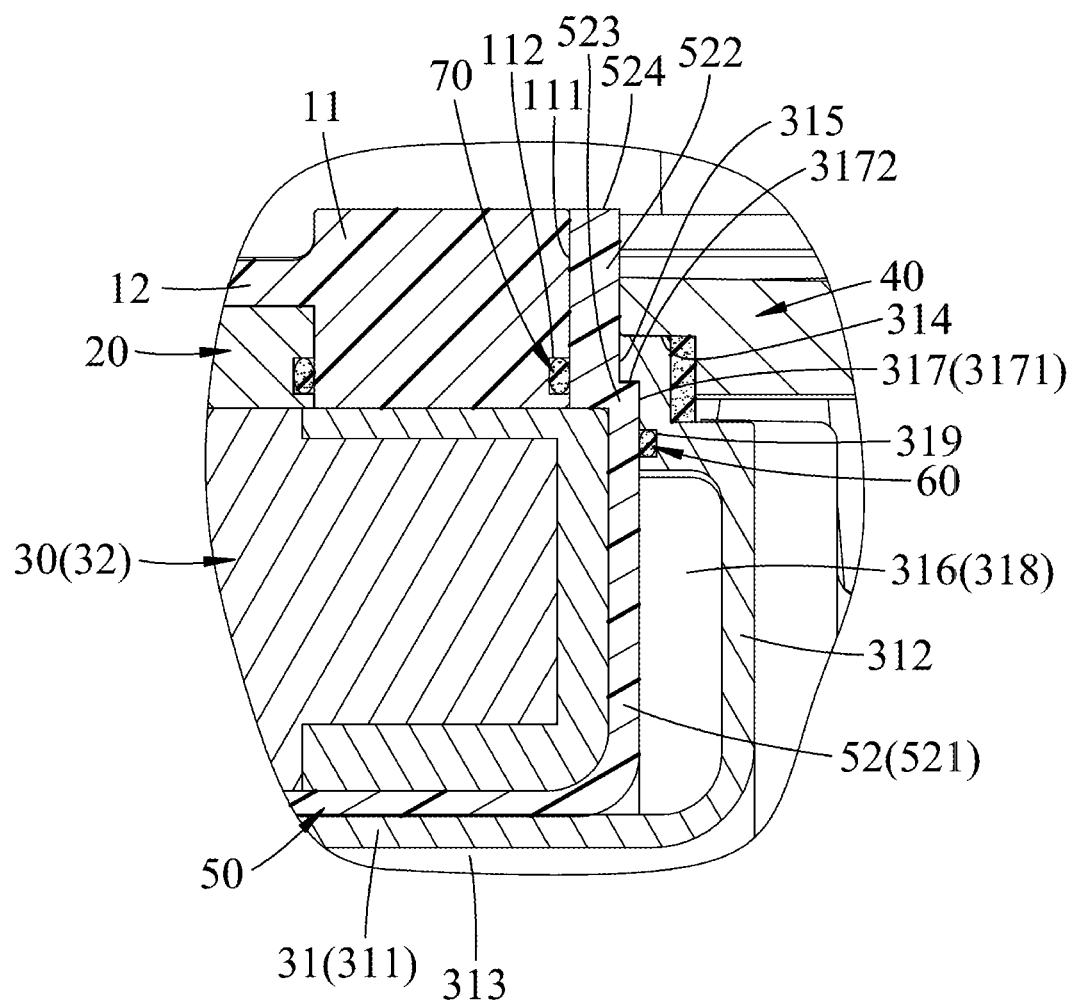
FIG. 2 is an enlarged fragmentary sectional view of the embodiment.

Referring to FIGS. 1 and 2, an embodiment of a canned motor device according to the disclosure includes a base 10, a fixed seat 20, a motor unit 30, a front cover 40, a rear cover protector 50, a leakproof member 60, and a sealing ring 70.

The base 10 is made of a plastic material, preferably an acid and base resistant plastic material such as polypropylene (PP), glass fiber reinforced polypropylene (GFRPP), polyvinylidene difluoride (PVDF), or glass fiber reinforced ethylene tetrafluoroethylene (CFRETFE). The base 10 has an annular main member 11 that surrounds the axis (L), a side cover member 12 that extends from the main member 11 along the axis (L), and a support frame 13 that is fixedly mounted to a bottom surface of the side cover member 12. The main member 11 has an end surface 111 that is perpendicular to the axis (L) and that is indented with a ring groove 112. The sealing ring 70 is mounted in the ring groove 112.

The fixed seat 20 is made of a metallic material, is tubular, and is mounted in the base 10 corresponding in position to the side cover member 12 thereof. In other words, the base 10 is sleeved around the fixed seat 20.

The motor unit 30 includes a case body 31 that is positioned relative to the fixed seat 20, a stator 32 that is sleeved around the case body 31 and that is sleeved by the fixed seat 20, a rotor 33 that is mounted in the case body 31, an impeller 34 that is connected to the rotor 33, and a rotor shaft 35 that is fixedly mounted to the case body 31 for supporting the rotor 33. The case body 31 has a hollow cylindrical portion 311 and a flange portion 312. The cylindrical portion 311 is formed with an open end and a closed end, and extends along and surrounds the axis (L) to define a mounting space 313 therein. Specifically, the rotor 33 is mounted in the mounting space 313 of the cylindrical portion 311 of the case body 31. The flange portion 312 is connected to the open end of the cylindrical portion 311, is perpendicular to the axis (L), and has an annular periphery 314 that surrounds the axis (L) and an end surface 315 that faces the end surface 111 of the main member 11 of the base 10 and that is indented with a stepped groove 316. The stepped groove 316 has a large-diameter section 317 that is defined by a groove bottom surface 3171 and a groove peripheral surface 3172 connected to the groove bottom surface 3171 and that is proximate to the end surface 315, and a small-diameter section 318 that is communicated with the large-diameter section 317. The groove bottom surface 3171 is indented with an annular groove 319 that surrounds the axis (L) for the leakproof member 60 to be mounted therein.

The front cover 40 is fixedly mounted to the base 10 via a plurality of screws 41 (only one is shown) and covers the impeller 34. The front cover 40 is for positioning of the impeller 34 along the axis (L) and for supporting the rotor shaft 35. The flange portion 312 is clamped between the base 10 and the front cover 40.

The rear cover protector 50 is made of a plastic material, preferably an acid and base resistant plastic material such as polypropylene (PP), glass fiber reinforced polypropylene (GFRPP), polyvinylidene difluoride (PVDF), or glass fiber reinforced ethylene tetrafluoroethylene (CFRETFE). The rear cover protector 50 has a main body portion 51 that is disposed between the case body 31 and the stator 32 and that is sleeved around the cylindrical portion 311 of the case body 31, and an extended portion 52 that is connected to the main body portion 51, that is perpendicular to the axis (L), and that abuts against the end surface 315 of the flange portion 312 of the case body 31. The extended portion 52 has an inner annular section 521 that is mounted to the large-diameter section 317 of the stepped groove 316 of the case body 31 and that abuts against the groove bottom surface 3171 of the large-diameter section 317, an outer annular section 522 that surrounds the inner annular section 521, a shoulder section 523 that interconnects the inner and outer annular sections 521, 522, and an outer periphery 524 that is formed on the outer annular section 522 and that surrounds the axis (L). The outer annular section 522 abuts against the end surface 315 of the flange portion 312 and the end surface 111 of the main member 11 of the base 10, the shoulder section 523 abuts against the groove peripheral surface 3172 of the large-diameter section 317, and the outer periphery 524 has an outline larger than that of the annular periphery 314 of the flange portion 312 of the case body 31.

Referring back to FIGS. 1 and 2, to fully assembled the embodiment, the front cover 40 is to be fixedly mounted to the main member 11 of the base 10, such that the extended portion 52 of the rear cover protector 50 becomes clamped between the main member 11 and the front cover 40, and that the flange portion 312 of the case body 31 becomes clamped between the front cover 40 and the extended portion 52. Due the the clamping between the abovementioned elements, the flange portion 312 becomes fixedly positioned relative to the base 10 and the fixed seat 20, such that the leakproof member 60, which is mounted in the annular groove 319 of the flange portion 312, is now mounted between the flange portion 312 and the extended portion 52 for maintaining fluid-tightness therebetween, and such that the sealing ring 70, which is mounted in the in the ring groove 112 of the base 10, is now mounted between the base 10 and the extended portion 52 for maintaining fluid-tightness therebetween.

After a period of use, even if the cylindrical portion 311 of the case body 31 of the motor unit 30 is broken, such that the chemical fluid begins to leak into a space between the case body 31 and the rear cover protector 50, placement of the rear cover protector 50 prevents the chemical fluid from leaking directly into the stator 32. Inclusion of the leakproof member 60, which ensures fluid-tightness between the flange portion 312 of the case body 31 and the extended portion 52 of the rear cover protector 50, further enhances leakage prevention. Since the outer periphery 524 of the extended portion 52 has an outline larger than that of the annular periphery 314 of the flange portion 312, when the chemical fluid in the space between the case body 31 and the rear cover protector 50 flows radially and outwardly toward the outer periphery 524 and the annular periphery 314, the chemical fluid would leak axially away from the stator 32 instead. Lastly, inclusion of the sealing ring 70, which ensures fluid-tightness between the base 10 and the extended portion 52, acts as the last measure to prevent chemical fluid leakage.

Overall, the canned motor device of the disclosure offers a design that is easy to assemble while providing numerous prevention measures against fluid leakage. By applying all of the abovementioned preventive measures into the design of the embodiment, the service life of the motor unit 30 can be greatly improved. Furthermore, the stepped groove 316 of the flange portion 312 and the inner, outer annular sections 521, 522 and the shoulder section 523 of extended portion 52 cooperatively defined unorthodox flow pathway which acts as physical barricade in diverting fluid flow, slowing down the leakage from affecting the stator 32.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A canned motor device comprising:
   a fixed seat;
   a motor unit positioned relative to said fixed seat and including
      a case body that has
      a hollow cylindrical portion extending along and surrounding an axis to define a mounting space therein, and formed with an open end and a closed end, and
      a flange portion connected to said open end of said cylindrical portion, being perpendicular to the axis, and having an annular periphery that surrounds the axis,
      a stator that is sleeved around said case body, and
      a rotor that is mounted in said mounting space of said cylindrical portion of said case body;
   a rear cover protector having
      a main body portion that is disposed between said case body and said stator and that is sleeved around said cylindrical portion of said case body, and
      an extended portion that is connected to the main body portion, that is perpendicular to the axis, that fluid-tightly abuts against said flange portion of said case body, and that has an outer periphery surrounding the axis and having an outline larger than that of said annular periphery of said flange portion of said case body; and
   a leakproof member mounted between said flange portion of said case body and said extended portion of said rear cover protector.

2. The canned motor device as claimed in claim 1, wherein:
   said flange portion of said motor unit further has an end surface that faces said extended portion of said rear cover protector and that is indented with a stepped groove;
   said stepped groove has a large-diameter section that is defined by a groove bottom surface and a groove peripheral surface connected to said groove bottom surface and that is proximate to said end surface, and a small-diameter section that is communicated with said large-diameter section;

said extended portion of said rear cover protector has an inner annular section that is mounted to said large-diameter section and that abuts against said groove bottom surface, an outer annular section that surrounds said inner annular section, and a shoulder section that interconnects said inner and outer annular sections; and said outer annular section abuts against said end surface of said flange portion, and said shoulder section abuts against said groove peripheral surface.

3. The canned motor device as claimed in claim 2, wherein:

said groove bottom surface of said flange portion of said motor unit is indented with an annular groove that surrounds the axis; and said leakproof member is mounted in said annular groove for maintaining fluid-tightness between said flange portion of said motor unit and said extended portion of said rear cover protector.

4. The canned motor device as claimed in claim 3, further comprising a base that is sleeved around said fixed seat, and a sealing ring that is mounted between said base and said extended portion of said rear cover protector.

5. The canned motor device as claimed in claim 4, wherein:

said base has an annular main member that surrounds the axis, and a side cover member that extends from said main member along the axis;

said main member has an end surface that is for said outer annular section to abut thereagainst and that is indented with a ring groove; and said sealing ring is mounted in said ring groove for maintaining fluid-tightness between said main member of said base and said extended portion of said rear cover protector.

\* \* \* \* \*